July 5, 1960 S. J. GARTNER 2,943,751

GRID TRANSFER MECHANISM

Original Filed April 15, 1954 8 Sheets-Sheet 1

INVENTOR
STANLEY J. GARTNER
BY Michael Hertz
ATTORNEY

GRID TRANSFER MECHANISM

Original Filed April 15, 1954

INVENTOR
STANLEY J. GARTNER
BY Michael Hertz
ATTORNEY

GRID TRANSFER MECHANISM

Original Filed April 15, 1954

8 Sheets-Sheet 3

INVENTOR
STANLEY J. GARTNER
BY Michael Hertz,
ATTORNEY

GRID TRANSFER MECHANISM

INVENTOR
STANLEY J. GARTNER
BY Michael Hertz
ATTORNEY

July 5, 1960 S. J. GARTNER 2,943,751

GRID TRANSFER MECHANISM

Original Filed April 15, 1954 8 Sheets-Sheet 5

INVENTOR
STANLEY J. GARTNER

BY Michael Olex,
ATTORNEY

INVENTOR
STANLEY J. GARTNER
BY Michael Hess
ATTORNEY

INVENTOR
STANLEY J. GARTNER
BY Michael Hertz,
ATTORNEY

INVENTOR
STANLEY. J. GARTNER
BY Michael Hertz
ATTORNEY

United States Patent Office 2,943,751

Patented July 5, 1960

2,943,751

GRID TRANSFER MECHANISM

Stanley J. Gartner, Emporium, Pa., assignor, by mesne assignments, to Sylvania Electric Products Inc., Wilmington, Del., a corporation of Delaware Application Feb. 15, 1957, Ser. No. 640,444, which is a division of application Ser. No. 423,391, Apr. 15, 1954, now Patent No. 2,821,825, dated Feb. 4, 1958. Divided and this application July 8, 1958, Ser. No. 747,303

1 Claim. (Cl. 214—1)

This invention relates to handling devices wherein articles are transferred one by one from a series of buckets mounted on a conveyer to pockets in a tray and wherein the tray is shifted from underneath a supply stack to a number of filling positions and then to a position beneath a second stack for elevation upward to a position from which the tray may be removed. Each of the pockets may have deposited therein one or a selected larger number of articles.

Specifically the invention relates to a grid traying device wherein grids are transferred from a grid making machine to pockets in trays.

It is an object of the invention to provide in such a machine means for insuring the stoppage of the machine in the event that some failure occurs in the transfer of grids from a bucket to a pocket in the tray, to provide a novel pick up nozzle and novel means for moving the same, to provide novel means for advancing the grid tray in two directions for loading pockets therein, to provide means for loading one or more grids as desired in each pocket, and to provide means for moving a tray from a supply chute of trays to a loaded tray chute from which the loaded trays may be manually removed. Other objects will be apparent after reading the detailed description below.

The invention will be understood after consideration of the following specification in conjunction with the accompanying drawings in which.

Figure 11:
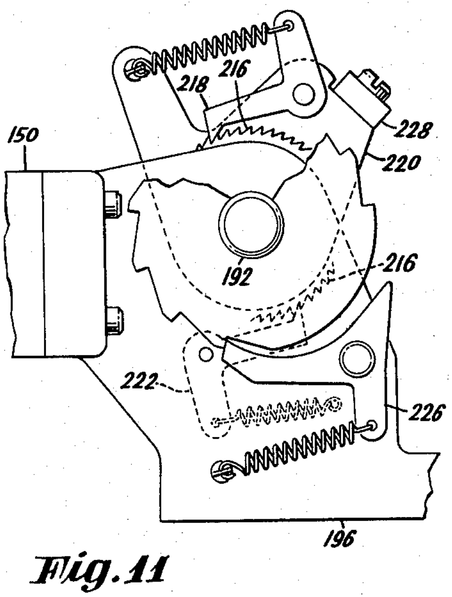
Figure 12:
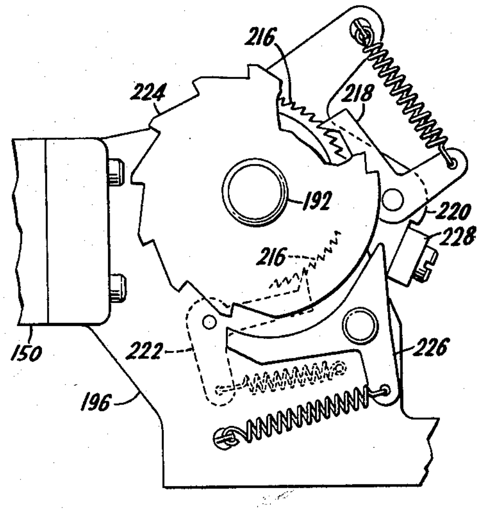
Figure 13:
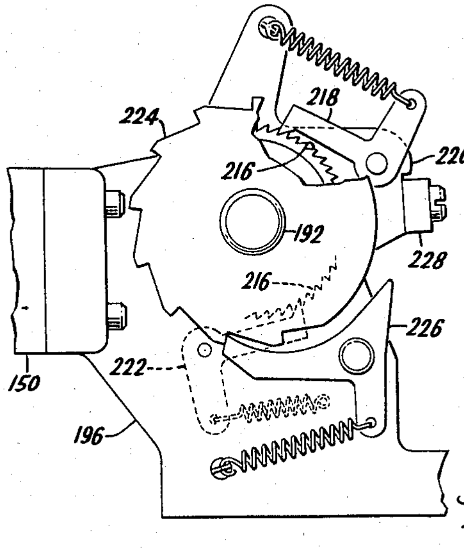
Figure 14:
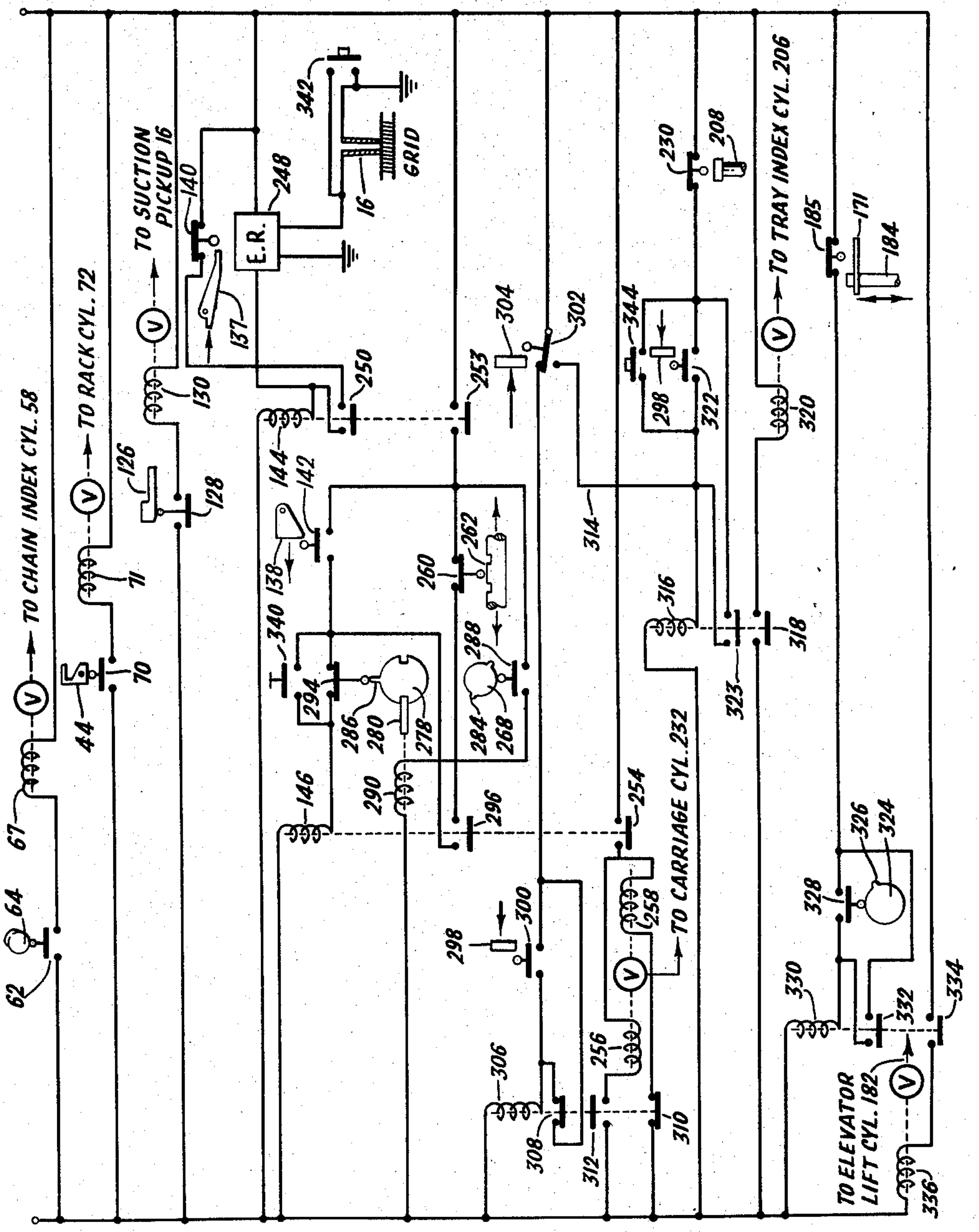

Figs. 11, 12, and 13 are views showing different positions of operating mechanism utilized for advancing the trays, and Fig. 14 is a wiring diagram of the circuitry empolyed in the traying device.

GENERAL DESCRIPTION

Figure 1:
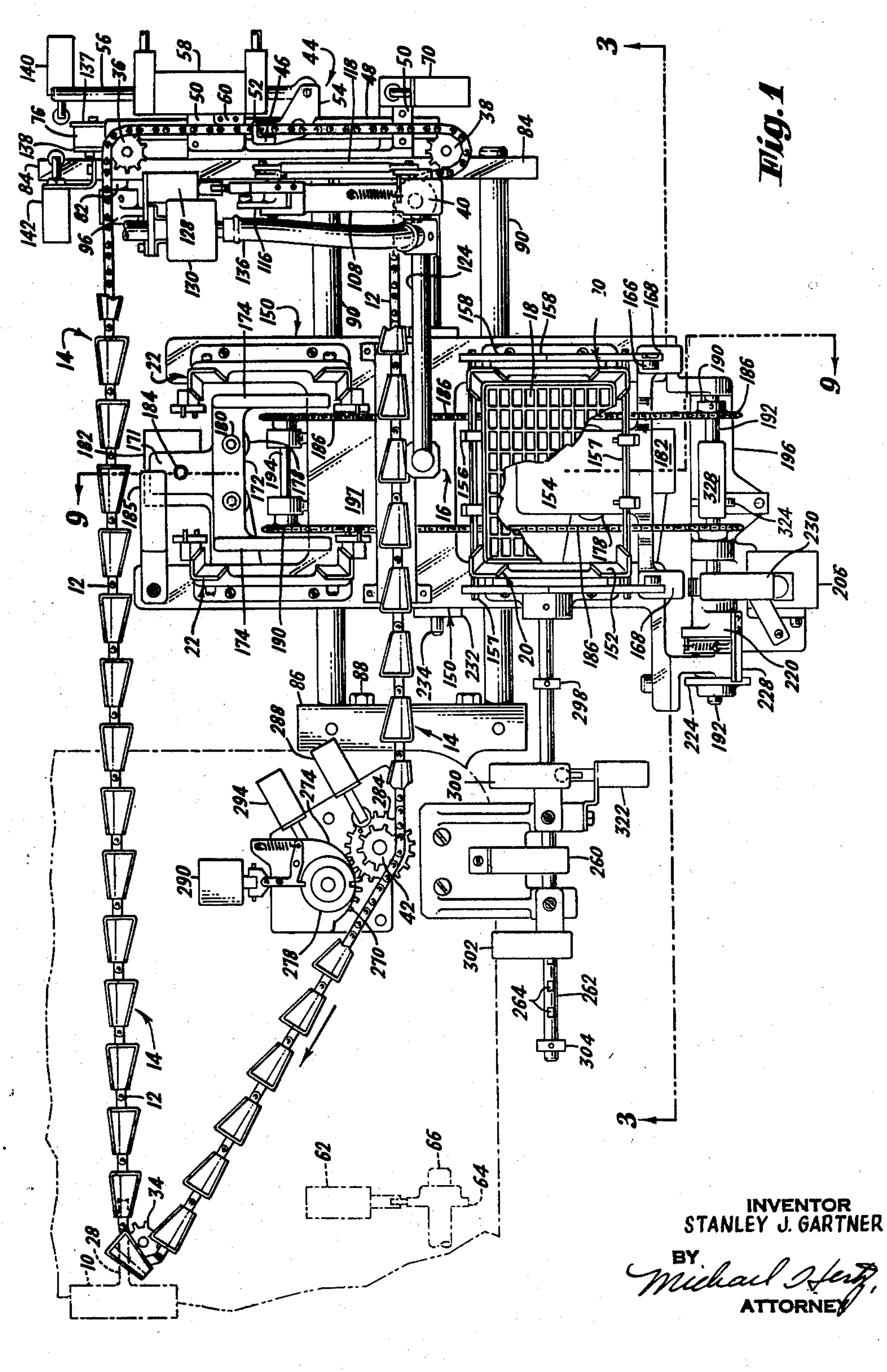
Fig. 1 is a plan view of a grid traying portion of a grid making machine.

In general, see Fig. 1, the traying device is located immediately adjacent to grid cut off station 10 of a grid making machine and its mechanism is timed to operate in synchronism with the cutoff tool of the grid making machine. The traying device comprises an intermittently movable endless conveyor 12 on which are fixedly mounted equally spaced buckets 14, these buckets catching the individual grids as they are cut off from a grid strip in the grid making machine and transferring them to a station from which the grids are removed from the buckets. The removal of the grids is effected by an oscillatory and vertically reciprocable suction nozzle 16 which removes the contents of a bucket and places the contents in a grid receiving tray 18 beneath the nozzle, the tray being provided with pockets to receive one, or more than one, grid in a pocket, as predetermined by a setting of the machine. Trays 18 are arranged in a supply chute 20 and from this chute they are delivered one by one to a position beneath the nozzle, for further serpentine indexing movement while being filled and for subsequent backward displacement to a receiving stacking chute 22.

All of the movements of parts are in timed relationship and controlled by switches as will be explained later on in detail.

*The bucket advancing mechanism*

Figure 4:
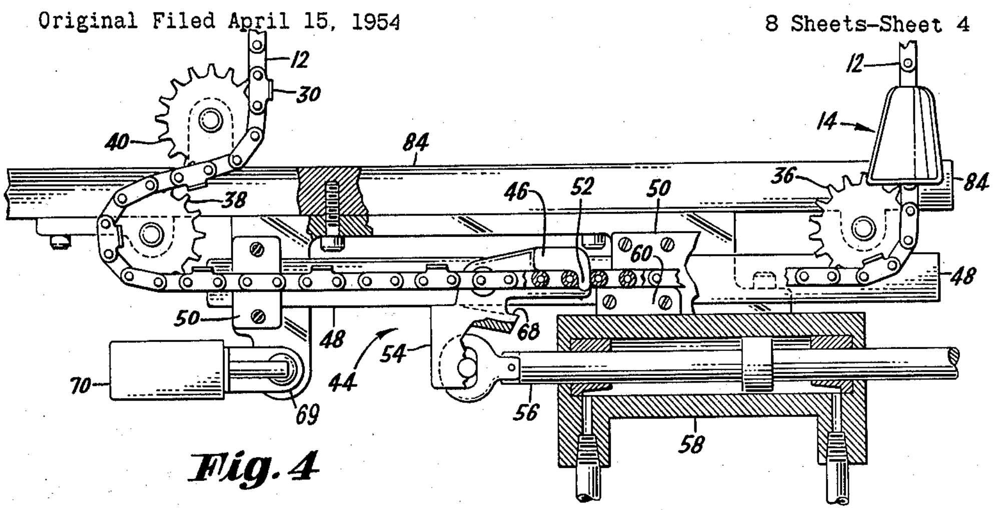
Fig. 4 is an enlarged view, partly in section, of a portion of a bucket conveyer advancing mechanism.
Figure 7:
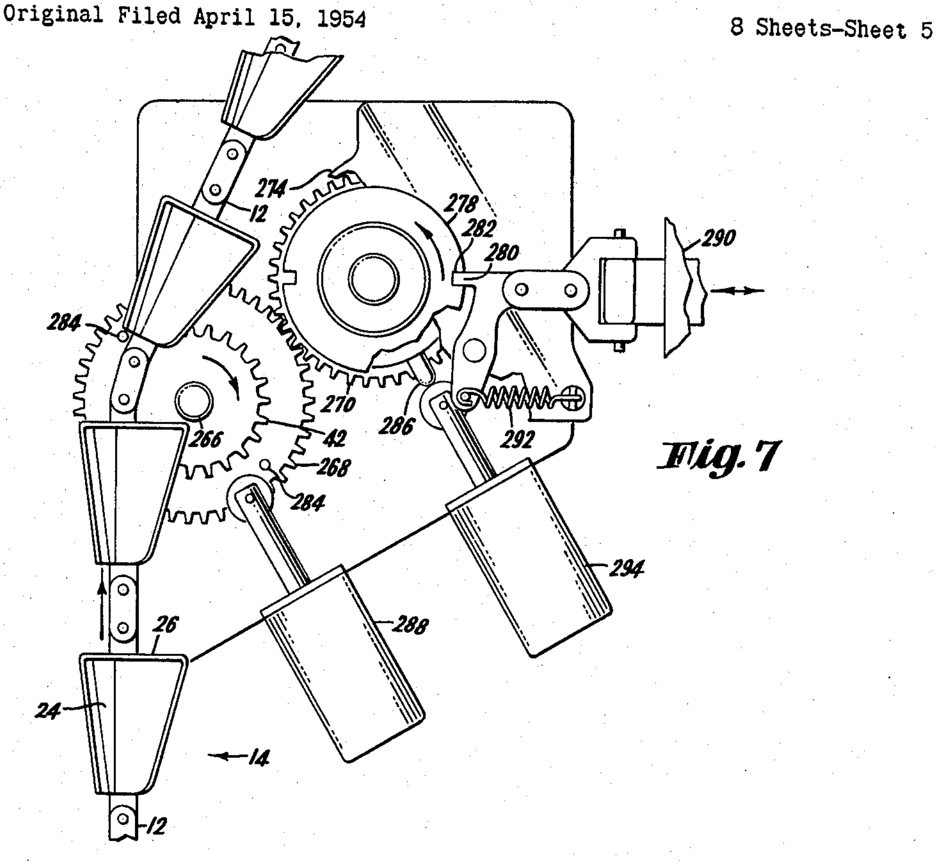
Fig. 7 is a plan view of tray carriage index movement determining means, parts being broken away.
Figure 8:
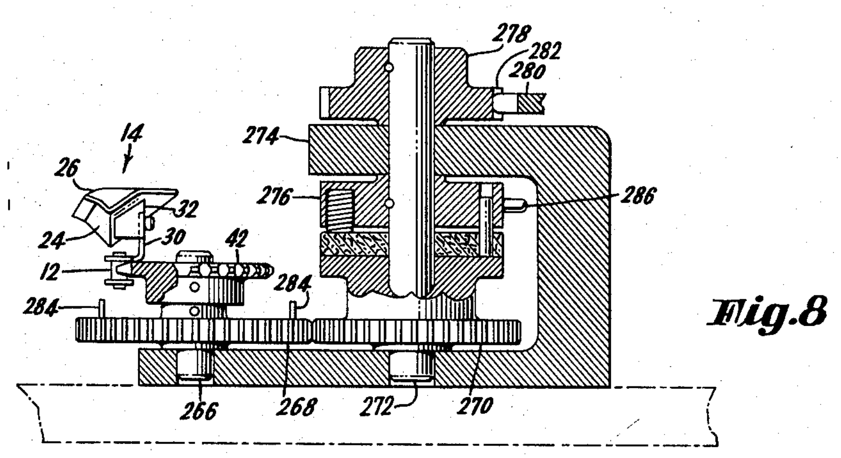
Fig. 8 is a vertical sectional view through the mechanism of Fig. 7.

Means are provided for transferring grids cut off at 10 in the grid making machine from that position to a position beneath the grid pick up nozzle 16. These means comprise the series of buckets 14 mounted on the conveyer 12. Each bucket, see Figs. 7 and 8, has a pair of inclined walls 24, and an end wall 26, the bucket tapering and widening in the direction of the end wall and also increasing in depth as the end wall is approached. This is so that grids cut off from the grid strip at the cut off station 10 and sliding down the delivery trough 28 will always be received in the same location in the buckets, with the grids lying in the deep wide ends of the buckets. The buckets, which may be of plastic material, are mounted on the conveyer chain 12 by means of right angle brackets 30 suitably secured to the chain at their lower ends and screw fastened or otherwise secured to blocks 32 molded in with the buckets. In Fig. 4, for the sake of clarity, only one bucket is shown, but it should be understood that there is one bucket for each angle bracket 30 and the brackets are mounted on alternate links of the conveyer chain.

The buckets travel in the direction of the arrow in Fig. 1, that is the upper reach of the chain travels to the right. The chain is trained over a number of idler sprockets indicated as 34, 36, 38, 40 and 42 and is intermittently moved, see Figs. 1 and 4, by stepping mechanism 44. The stepping mechanism comprises a pawl 46 pivoted on a bar 48 slidable longitudinally in a pair of fixed bearing blocks 50, 50, the pawl having a tooth or toe 52 movable into between and out of the links of the chain conveyor 12. The heel 54 of the pawl is slidably and pivotally engaged with an end of the piston rod 56 operating in the fixed hydraulic cylinder 58.

When fluid pressure is admitted behind the piston on the piston rod, that is to the right of the cylinder 58 in Fig. 4, the initial displacement of the piston rod causes the pawl 46 to swing about its pivot to engage the toe 52 with the chain. It is this slightly advanced position of the piston which is shown in Fig. 4. To assist in effecting this engagement, an abutment block 60 is provided against which the chain is thrust when the toe of the pawl is swung into engagement with the chain. Further movement of the piston rod toward the left in Fig. 4 forces the pawl 46 and bar 48 to move in a longitudinal direction to advance the chain conveyer and the buckets one step and so that the next bucket is in position at station 10 to catch a grid. The timing is such that each receives only one grid from the grid making machine.

The chain advancing movement is initiated by closing of a switch 62, see Figs. 1 and 14, operated by a cam 64 fixed on a shaft 66 of the grid making machine, the shaft 66 being synchronized with the cutting tool at station 10.

The closing of this switch energizes a solenoid 67 which controls hydraulic valve mechanism to admit fluid to the right of the piston in Fig. 4. Opening of the switch de-energizes the solenoid and allows fluid to be vented from the right of the piston and to be admitted to the left of the piston in Fig. 4 to retract the pawl and bar 48. The initial retracting movement of the piston rod effects disengagement of the toe 52 of the pawl from the chain, rotation of the pawl on its pivot being limited by engagement of a shoulder 68 on the pawl with a face of bar 48. Subsequent movement of the pawl to initial starting position takes place independent of chain movement. The chain is therefore advanced in one direction only at intervals determined by the operation of cam 64.

*The nozzle translating and oscillating means*

Figure 2:
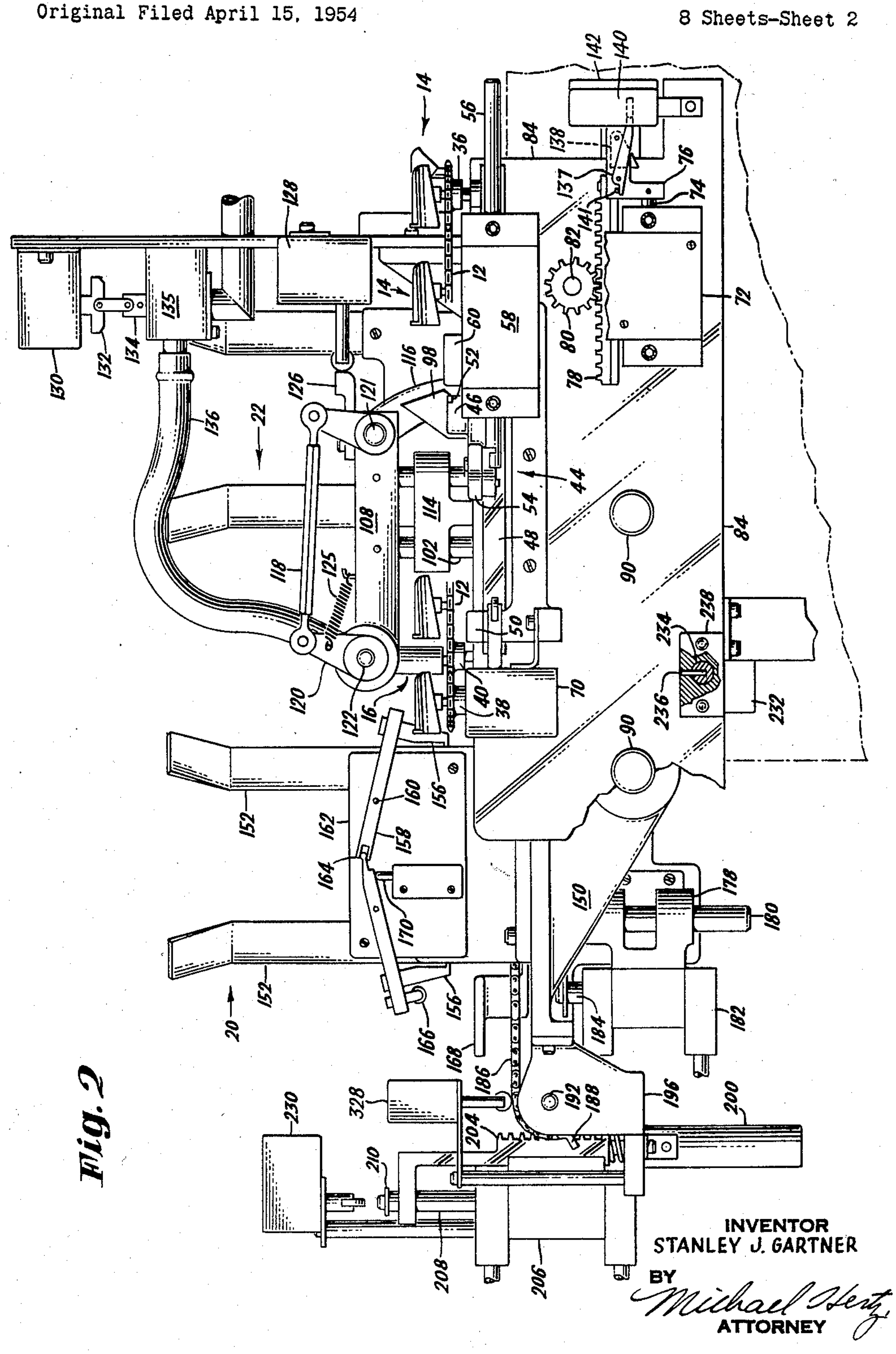
Fig. 2 is an end view of a traying device looking toward the left in Fig. 1.
Figures 5, 6:
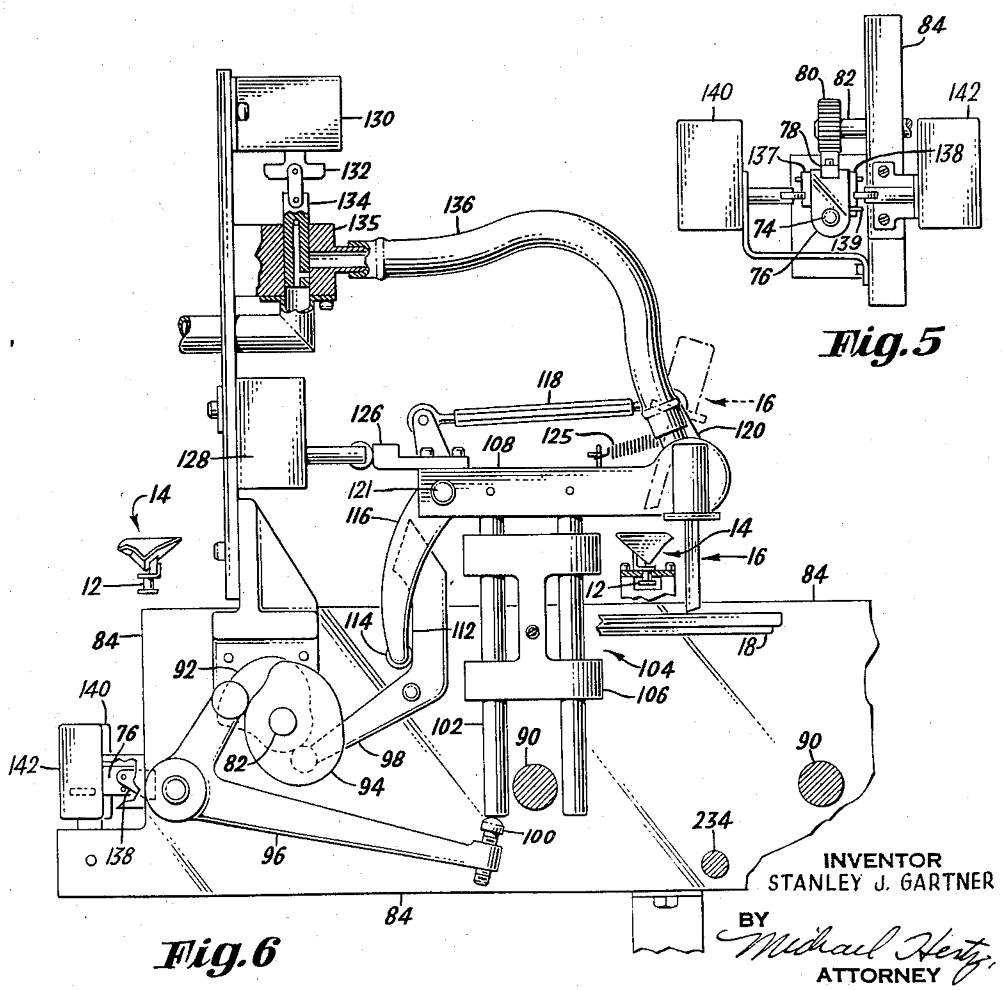
Fig. 5 is an end view of a rack and pinion utilized to effect movement of a nozzle carriage together with switches operated by rack carried pawls.
Fig. 6 is a side elevational view of a nozzle carriage and operating means associated therewith, parts being shown in section.

On the completion of chain indexing movement and prior to the release of the pawl 46 from the chain, the pawl comes into contact with operating roller 69 of switch 70; this switch closes a circuit to a solenoid 71 (Fig. 14) to cause hydraulic fluid to flow into fixed cylinder 72 (see lower right of Fig. 2) to move a piston rod 74 to the right in Fig. 2 or toward the reader out of the paper in Fig. 5. To the piston rod is secured an angular bracket 76 carrying on its upper surface a rack 78. Displacement of the rack to the right in Fig. 2 effects counter clockwise rotation of a gear 80, said gear being fixed on a shaft 82. The shaft 82 (see top, right, of Fig. 1) finds bearing in the end plate 84 of a rectangular frame consisting of said end plate 84, a second end plate 86 fastened to the grid machine as by screws 88, and two round bars 90 joining the end plates. Fixed on the shaft 82 (see Fig. 6) within the rectangular frame is a pair of cams 92 and 94, each cam operating a bell crank lever. There are two bell crank levers 96 and 98 having followers reacting against the cams. The lever 96 has an adjustable button 100 thrusting against a rod 102 of a vertically movable frame 104, the frame being guided for vertical movement by bearing block fixture 106 fastened to the end plate 84. The upper end of frame 104 is a horizontal bar 108 pivotally carrying, at the forward end, the pickup nozzle 16. The lever 98 has a straight line cam surface 112 with concave and bevelled portions at its upper end, the lever cooperating with a cam follower roller 114 on the lower end of a bent lever 116 pivoted at 121 on the rear end of the bar 108. The upper end of the lever 116 is connected to one end of a turnbuckle link 118, the opposite end of which is connected to a crank arm 120, see Figs. 2 and 3, fixed on a shaft 122 to which is also fixed a cantilever tube 124 at the free end of which is fixed the pickup nozzle 16. A spring 125 serves to maintain the roller 114 against the lever 98. The nozzle has a mouth bevelled in two directions, see Figs. 3 and 9, to conform with the plane of rest of a grid lying on the sloping bottom of a bucket. The cams 92, 94 and cam surfaces 112 are designed so as to cause the end of the pick up nozzle to describe a path from an initial lowered position wherein the nozzle is immediately above the grid tray to a raised and swung position where the nozzle is above a bucket, then down into the bucket for suction adherence of a grid to the nozzle, then up again and out of the bucket, swung again out of the path of the bucket and finally down to the full line position shown in Fig. 6. In this last position the nozzle or pick up finger has its suction cut off so that the grid would be released from the nozzle. This is effected by reason of a switch operating bar 126, see Figs. 2 and 6, mounted on the horizontal bar 108 engaging the plunger of a switch 128 to move the same to cause a solenoid 130 to be deenergized to permit dropping of a plunger core 132. This core is connected to a valve stem 134, operating in a valve block 135, the stem cutting off the suction to the nozzle on release of the solenoid core. When the pick up finger is raised above its lowest position the switch 128 closes, raising the core and placing the nozzle in communication with an exhaust device. A flexible hose 136 connects the valve block 135 with the tube 124 leading to the nozzle.

*Tray supply and receiving*

Referring to Figs. 1, 2, and 5, it will be seen that the bracket 76 carries two levers 137 and 138 as well as the rack 78. The lever 137 is on one side of the bracket to operate the plunger of a normally closed flick switch 140 and the lever 138 is on the other side, being designed to operate the plunger of a normally open flick switch 142. Switch 140 effects the release of a self locking relay 144 while switch 142 effects the closing of a second self locking relay 146. The lever 137 has a sloping bottom portion and it is designed so that the lowest free end portion only of the lever will engage the plunger of switch 140 to operate the same, the plunger afterwards moving out beneath the lever, as the lever is advanced by the rack. The pivotal motion of the lever is limited by the stop pin 141. On reverse movement of the lever, the lower surface thereof rides over the plunger and the lever pivots, thereby not operating the switch. The lever 138 is pivoted so that on right hand movement of the rack in Fig. 2 the lever pivots upward. On the left hand movement of the rack, the vertical face of lever 138 operates the switch 142. The downward pivotal movement of the lever is limited by stop pin 139 illustrated in Fig. 5.

Figure 3:
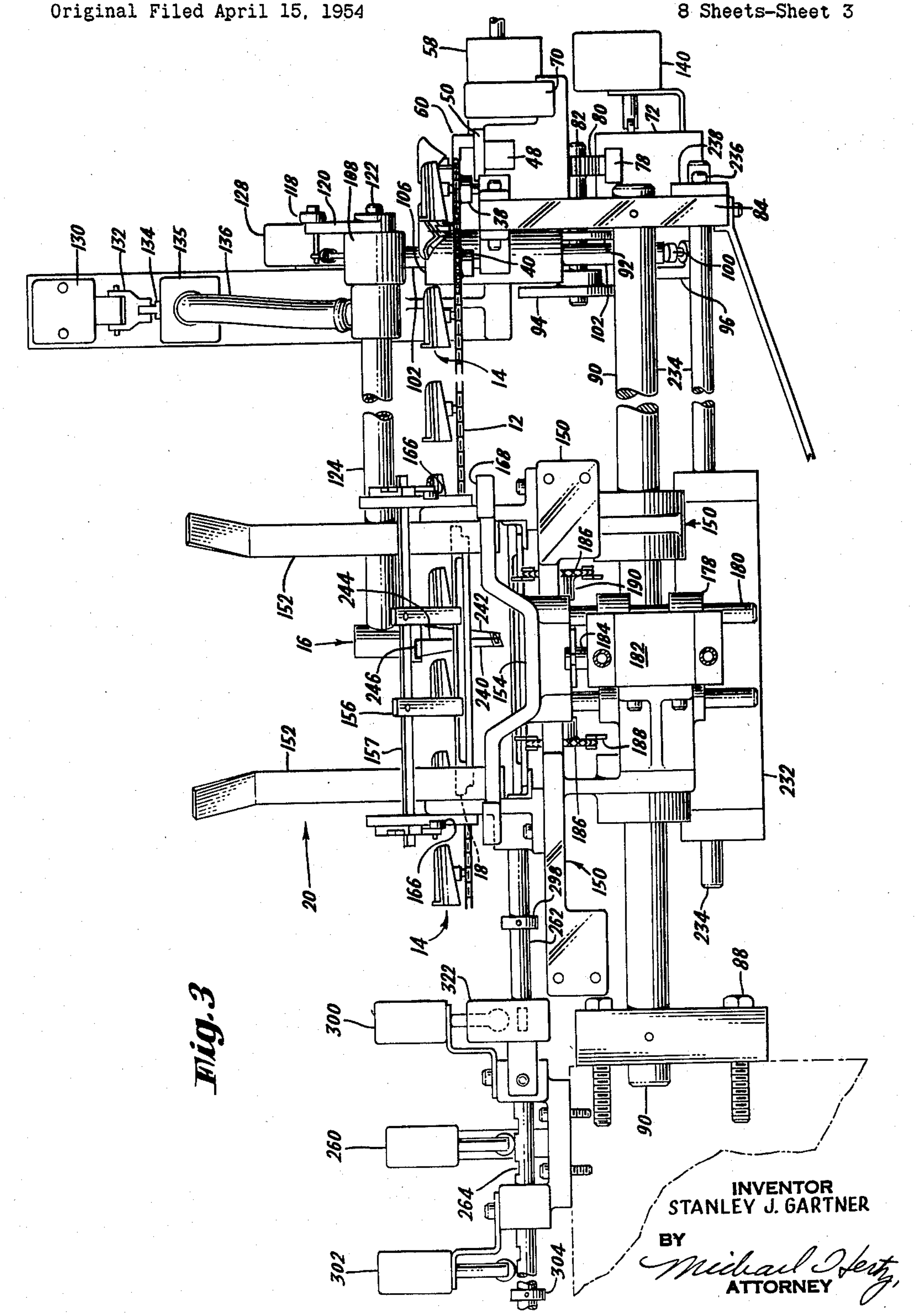
Fig. 3 is a front elevational view of the traying device, parts being removed.
Figure 9:
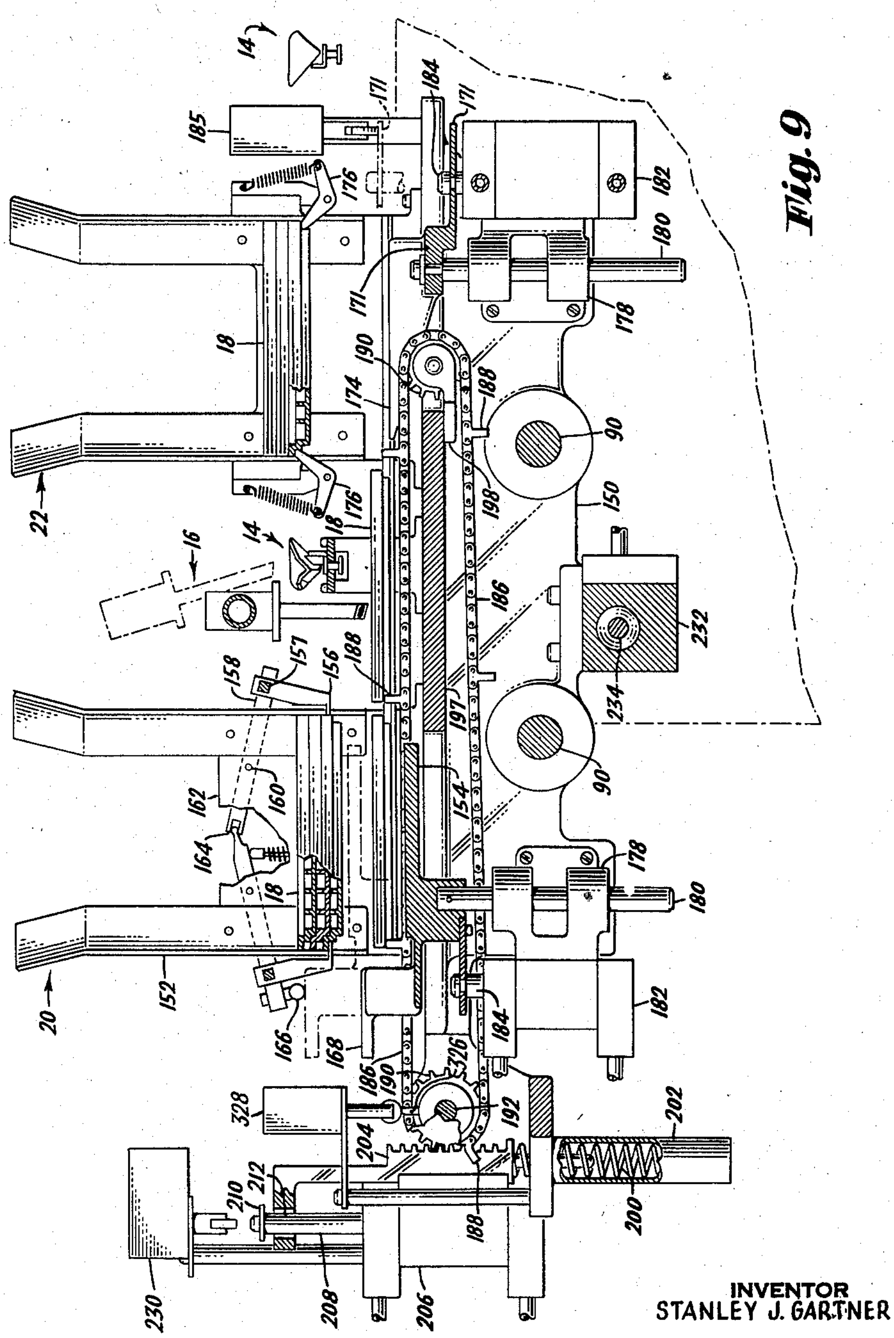
Fig. 9 is a vertical sectional view showing means for advancing a tray along a tray carriage from a tray storage stack to a tray receiving stack.
Figure 10:
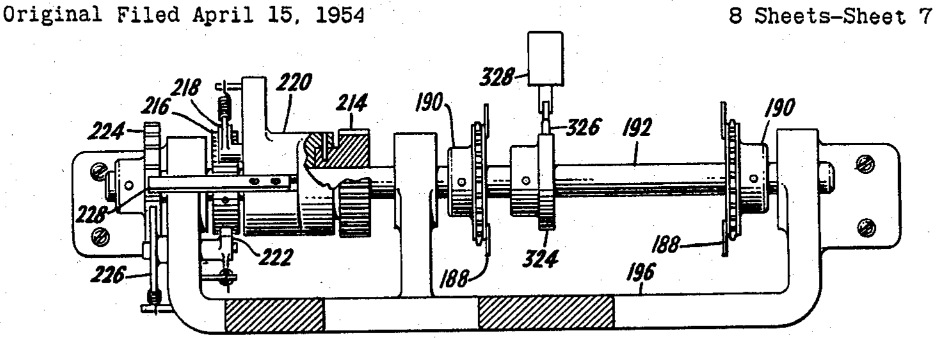
Fig. 10 is an elevational view, partly in section, of a portion of the tray advancing means.

Slidable on the rods 90 is a carriage 150, this carriage fixedly carrying the supply and receiving chutes 20 and 22. The supply chute comprises four upright angles 152 one at each corner of a rectangle, suitably spaced apart to guide the trays 18 placed in the angles. The trays are held within the angles and above the surface of a tray elevator 154, to be described later, by two pairs of release fingers 156, one pair on each side of the supply chute. On each side of the chute each of the fingers is secured to a lever 158 pivoted at 160 on a web or plate 162 spanning a pair of angles, the levers being articulated at their other ends, as at 164, so that pviotal movement of one lever will force pivotal movement of the other. The levers at the front of the machine, i.e., at the left in Fig. 2, are provided with rollers 166 to be engaged by elevator extensions 168 to swing all of the fingers out from under the bottommost tray to release the same. A spring pressed plunger 170 returns the fingers to their holding positions as the elevator drops. The parts are so proportioned that the fingers slide into the path of movement of the trays above the bottommost tray in the stack prior to full descent of the elevator, the trays for this purpose having overhanging rims, as shown in Figs. 3 and 9. There is a second elevator beneath the receiving chute 22, this elevator comprising a tongue 171, a transverse web piece 172 and the rails 174.

The rails 174, on the upward movement of the second elevator, lifts a tray into the receiving chute, to be retained therein by spring operated fingers 176, there being a pair of fingers at the forward face of the chute and another pair at the rear face of the chute. A tray when lifted by the elevator would ratchet past the fingers, lifting other trays above it in the receiving chute, if they be present, and then sink downward on the fingers as the elevator recedes.

The elevators are guided for vertical movement on the carriage by four guides 178 mounted on the carriage, two being beneath the supply chute and two beneath the receiving chute. The elevators are provided with pins 180 sliding in these guides. To raise and lower the elevators there is provided a pair of fluid motors 182, one at each end of the carriage and each positioned centrally between the two guides at the respective end. The pistons 184 of the motors are fixedly secured to the elevators. A reciprocating movement of the elevators will therefore release a tray from the supply chute and at the same time force another tray into the receiving chute. At the end of the upward stroke of the elevators the tongue 171 of the rear elevator operates the plunger of a switch 185 to reverse the fluid motors 182 and lower the elevators to initial position.

*Tray indexing*

The trays are indexed from front to rear of the machine (to the right in Fig. 9) by a chain mechanism comprising a pair of spaced apart parallel chains 186, each having lugs 188 in opposition to one another on the chains and equally spaced therealong, the lugs of the chains being operative to engage the forward end of a tray and propel the tray to the rear of the machine upon indexing movement of the chains. The chains are trained around sprockets 190 mounted on shafts 192 and 194 at the front and rear of the carriage, the front sprockets being pinned to the shaft 192 mounted on the carriage and the rear sprockets being loose on the shaft 194. The shaft 192 is mounted in a bearing frame 196 secured to the front of the carriage while the shaft 194 is mounted on carriage plate 197 by brackets 198. The trays themselves are partitioned longitudinally and transversely to form pockets, rectangular in plan.

A tray is indexed rearwardly of the machine a distance in accordance with the spacing between the transverse centers of the pockets and the carriage is indexed longitudinally of the machine (from right to left of the machine Fig. 1 or the reverse) distances dependent on the longitudinal spacing of the pockets in the tray. In addition the machine provides for a longer transverse indexing movement of the tray rearwardly of the machine on exchange of trays under the grid transfer nozzle.

To effect the transverse indexing movement of the trays, see Figs. 9 to 13, there is provided a compression spring 200 reacting at its lower end against the bottom of a cage 202 fastened to the carriage and reacting at its upper end against the bottom of rack bar 204. The rack bar is restrained against upward movement by fluid pressure mechanism comprising a cylinder 206, a piston 208 and a washer 210 on the piston, the piston passing freely through an opening 212 in a right angular portion of the rack bar with the washer normally engaging the upper surface of the angular portion thus restraining upward movement of the rack bar. On fluid pressure being released from above the piston and fluid being admitted beneath the piston, the rack bar will be permitted to rise until otherwise restrained, as will be explained, but the piston may continue to move upward. On fluid pressure being applied above the piston, the washer 210 will move down into engagement with the rack bar and will depress the bar against the action of spring 200.

The rack bar is engaged with a pinion 214 freely rotatable on shaft 192. Also mounted on the shaft but pinned thereto is a ratchet wheel 216. This ratchet wheel is driven by a pawl 218 pivotally mounted on an arm of a sleeve 220 freely rotatable about the shaft but pinned to the rack bar driven pinion 214. Upward movement of the rack bar will therefore move the pawl to rotate the ratchet wheel and the shaft 192 while downward movement of the rack bar will merely result in the ratcheting of the pawl 216 over the teeth of the ratchet wheel. A spring pressed arresting pawl 222 is provided to prevent undesired backward rotation of the ratchet wheel. Also pinned on the shaft is a rotation limiting means in the form of a stepped detent wheel 224 having a number of short steps proportional to the transverse spacing between pockets of a tray and a single long step proportional to the distance a tray should be moved from the last transverse pocket of one tray to the first transverse pocket of the next tray. Cooperating with this detent wheel is the spring urged stop pawl 226 to limit the rotation of the shaft to the angular distances provided by the steps on the wheel 224. When the rack bar is down an arm 228 fast on the sleeve 220 has released the stop pawl 226; initial movement of the rack bar upward releases the stop pawl to the action of its spring. But in the meantime the detent wheel 224 has moved through a sufficient angular distance to allow the pawl 226 to come to rest on the next step. Rotating of the detent wheel and therefore ratchet wheel 216, sleeve 220 and pinion 214 therefore continues until the toe of pawl 226 engages the next tooth. Thus the pinion 214 drives the rack 204 up a limited extent. While the rack bar is limited in upward displacement by the detent wheel 224, the piston 208 can continue to move upward until its upper end engages the plunger of a switch 230 serving to reverse the valves controlling the cylinder 206 to effect downward displacement of the piston 208 and the rack bar, the pawl 218 at this time ratcheting idly back over the teeth of the ratchet wheel 216. The movement of the rack in one direction has rotated the shaft 192 through an angular distance determined by the length of the steps on the detent wheel 224 and thus has driven the sprockets 190 a given angular distance. Thereby the lugs 188 on the chains driven by the sprockets have advanced a fixed required distance, advancing the grid trays a distance equal to the spacing of the pockets therein or the spacing between the last row of pockets in one tray and the first row of the next tray.

*Carriage index and reverse*

The carriage 150, as stated heretofore, slides on the bars 90. Affixed horizontally to the underside of the carriage is a double ended cylinder 232 and affixed to the framework end plate 84 is a piston rod 234, the same being fixed to the end plate by a pin 236 and restrained against shearing of the pin by having a reduced neck portion thrusting against a block 238 fastened to the end plate. The piston rod has a piston within the cylinder and fluid pressure on one side of the piston will drive the cylinder and carriage in one direction while fluid pressure in the other side of the cylinder will drive the cylinder and carriage in the reverse direction. The carriage is moved step by step under control of a number of switches and dependent on the adherence of a grid to the nozzle 16. The end portion of the nozzle, see Fig. 3, is constructed of two vertical channel terminals 240, 242, of conductive material separated from each other by an insulating strip 244, the channel member 242 being grounded through machine parts and the other member 240 insulated from the machine as by an insulating strip 246. When a grid shorts the nozzle terminals, an electronic relay 248, which may for example include a triode whose grid bias is controlled by grounding the grid of the tube through shorting of the nozzle terminals, closes the circuit for the relay 144. This relay has a self locking contact 250 which shorts the electronic relay. As stated previously, the relay is released on momentary opening of normally closed flick switch 140. The relay also closes contacts 253 to control the completion of a circuit to the relay 146 previously described. The relay 146, when energized, closes contact 254 thereby closing the circuit to one or the other of a pair of valve energizing solenoids 256 or 258. In Fig. 14 the circuit to the solenoid 258 is shown as prepared to be closed so that an operation of the valves leading to cylinder 232 will be effected to move the cylinder and carriage shown in Fig. 3 to the right. The indexing of the carriage is controlled by a switch 260 whose plunger rides on a rod 262 having equally spaced slots 264. The rod is fixed to the carriage and has as many slots as there are pockets in the tray, counting longitudinally of the tray, i.e., from left to right in Fig. 1. In the position shown in Fig. 3, the switch is closed with the plunger of the switch riding on the high part of the rod. When a recess 264 comes into registration with the plunger, the plunger drops into the slot, the switch opens and indexing movement of the carriage ceases. The indexing movement of the carriage is under further control of a grid counting mechanism as follows:

Each time the bucket carrying chain 12 is advanced by the stepping mechanism 44, the idler sprocket 42 is rotated through a half revolution. See Figs. 1, 7, and 8. The sprocket is pinned to a stub shaft 266, suitably mounted in the frame of the traying device, to which is also pinned a pinion 268 meshing with a second pinion 270 freely rotatable on a second stub shaft 272 also mounted in the frame of the traying device. The diameters of the gears are such that one half revolution of gear 268 results in greater than one half revolution of gear 270. Pinned on the stub shaft 272 and on opposite sides of a support arm 274 extending up from the traying device frame is a pair of discs 276 and 278. The disc 276 is slip frictionally driven by the pinion in any known manner and is arrested in its rotational movement with the pinion 270 by the action of detent 280 normally riding on the periphery of the disc 278 but eventually spring pressed into one of the slots 282 in the detent disc 278.

As many slots or notches are placed in disc 278 as the number of grids it is desired to load in each pocket of a tray and, in practice, the mounting for the disc is made in a fashion to facilitate interchange of a disc with another disc having a different number of notches. The pinion 268 is provided with a pair of diametrically arranged upstanding switch plunger operating pins 284 and the disc 276 is provided with a radial switch operating finger 286. Each time the buckets are indexed, one of the pins moves past the plunger of a normally open switch 288 thereby momentarily controlling the closing of a circuit to a detent release coil 290 whose core will release the detent 280 against the action of the restoring spring 292 allowing the friction drive to advance the disc 276 and its finger 286. In the arrangement shown the advance of two buckets will permit the finger 286 to reach the position wherein the plunger of a switch 294 will be closed to complete the circuit to relay 146, previously described. Thus, see Fig. 10, when a grid shorts the nozzle 16, the switch 253 will be closed. Thereafter it is possible for the switch 288 to function to energize solenoid 290 to withdraw detent 280 to enable switch 294 to close to prepare the circuit to relay 146, the circuit being finally momentarily closed when the lever 138, Fig. 2, momentarily closes switch 142. Then the carriage starts to index causing switch 260 to close. This switch is in series with a relay contact 296 and the series connected arrangement is in parallel with switch 142 whereby the circuit to the indexing solenoid 258 (or 256) is maintained closed at contact 254 until the plunger of switch 260 drops into a recess 264 in the bar 262 thereby opening the circuit to relay 146 and allowing contact 254 to drop open.

*Carriage reverse*

In addition to the control of carriage movement exercised by the switch 254 there is also provided switch means for reversing the direction of movement of the carriage. At the right hand end of rod 262, Fig. 1, there is provided a fixed collar 298, which on movement of the carriage to the extreme left will engage the plunger of a normally open carriage reverse control switch 300. A second single pole double throw switch 302, located in position to be activated by a second fixed collar 304 on the rod 262, is connected in with the first switch with the pole normally closed on the switch contact in series with the switch 300. Momentary closing of switch 300 will complete a circuit through a relay 306 to pull up self locking contacts 308 and close contacts 310 to solenoid 258. Thereby the carriage will start to travel to the right until the contacts at 254 are opened by switch 260

(controlled by the notches in rod 262) opening the circuit for relay 146. It should be noted that on a proper number of grids being placed in a pocket of a tray, the radial finger 286 will be in a position wherein the switch 294 is maintained closed. Therefore, the opening of switch 260 determines the stoppage of the carriage. After indexing of the carriage to the right has continued until collar 304 engages the plunger of switch 302, the switch 302 is momentarily shifted to its other contact and away from its series connected contact thereby releasing the relay 306 to allow contact 310 to drop open and another contact 312 to close. Contact 312 energizes solenoid 256 to cause the carriage to reverse its direction of movement, the movement again being under control of the notches in shaft 262.

*Tray index control*

When the switch 302 is operated by the collar 304, as stated heretofore, the switch is momentarily caused to make contact with a second contact leading via line 314 to a self holding tray index control relay 316. This relay has contacts 318 in series with a tray index solenoid 320 controlling the valves leading to cylinder 206 and self holding contacts 323. On operation of the piston rod 208 of cylinder 206, as previously described, the limit switch 230 is momentarily opened to break the holding circuit of relay 316 to allow the tray index operating mechanism to return to initial position. The relay 316 is also momentarily energized through operation of a second normally open switch 322 closable by the collar 298. This switch is in series with limit switch 230 and the coil of relay 316, it will therefore serve to pull up the relay when the switch is momentarily closed, the holding circuit of the relay being then established around the switch 322 by the contacts 323.

*Elevator lift control*

As the tray is indexed by the intermittent stepping of the shaft 192, the shaft also steps around a disc 324 having a radial pin 326. After a tray has been indexed toward the rear of the carriage, as previously described, the pin 326 brushes by the plunger of a switch 328 thereby momentarily closing the circuit to self locking relay 330. This relay has locking contacts 332 shorting the switch 328 and elevator lift control solenoid contact 334 for energizing a solenoid 336 operating valves to control cylinders 182. The contact 334 will drop out upon the circuit to the relay 330 being broken by elevator operated switch 185.

*Supplemental controls*

Several supplemental switches are provided to enable convenient servicing operations. Thus, a switch 342 is provided shorting grid pick up nozzle 16 so as to enable the machine to operate even if no grids lie in the buckets or in the event of dirt lodging on the suction tip of the nozzle preventing contact between a grid and an electrode of the nozzle. Also a short circuiting switch 340 about the switch 294 is provided to enable carriage indexing to take place for each nozzle movement, regardless of the number of notches in the detent wheel 278. A third service switch 344 is provided to effect, upon closure thereof, tray index movement independently of other machine movements.

*Summary of operation*

Now that the component parts of the machine have been described, a review of the operation of the entire machine is in order. The wiring diagram of Fig. 14 will be helpful in considering the sequence of operation of parts.

*Bucket advance*

On a grid being severed from a grid strip in the grid making machine, the cam 64 operates the switch 62 energizing solenoid 67 to operate valves to admit fluid pressure to the rear of chain indexing cylinder 58. This causes the claw 44 to advance the chain 12, moving the buckets one step past the grid discharge chute 10 and into a position from which the suction nozzle or picker finger 16 may pick up a grid and transfer it to a pocket in a grid tray.

*Nozzle movement*

On the completion of the chain advancing stroke, the claw 44 operates switch 70 to close the circuit to solenoid 71 for operating a valve to admit fluid pressure to the forward end of cylinder 72 to drive the rack 78 back, rotate the pinion 80, the shaft 82, the cams 92 and 94 and through the cams cause the suction nozzle to travel through its orbit. Upward movement of the nozzle frame closes the circuit through switch 128 to the suction valve solenoid 130 opening the suction path; and lowering of the frame breaks the circuit, closing off the suction.

*Carriage index*

If the nozzle picks up a grid from a bucket, the electrodes of the nozzle are shorted and relay 144, controlling carriage indexing operation, is energized. If no grid be present, the relay is not energized and the carriage will not index. On a grid being picked up, the relay 144 closes switch 253 preparing the relay control for the indexing circuit. Also preparing the circuit is switch 294 closed only when the detent operating solenoid 290 has been energized a required number of times. As shown there are two notches in the detent disc 278 and two grids will be deposited in each pocket of a tray. The solenoid 290 is energized only when the chain has driven a pin 284 past the plunger of switch 288, and also concurrently when switch 253 is closed, i.e., concurrently when a grid is shorting nozzle 16 so as to energize relay 144 to close switch 253. With the circuit thus prepared, the backward stroke of rack 78 causes lever 138 to momentarily close switch 142 thereby drawing up the contacts of relay 146, closing the relay self locking contacts 296 around switch 142 and closing contact 254 to prepare the carriage index circuit. The relay 146 drops out after the grid has been released by the nozzle and lever 137 on rack bar 78 has momentarily tripped open the switch 140. The levers 137 and 138 are so pivoted that lever 138 operates switch 142 only on the backslide of the rack, i.e., on the left hand stroke in Fig. 2, while lever 137 operates switch 140 only on the forward stroke of the rack. When switch 142 is closed, as well as switches 294 and 253, the carriage starts to index and a portion of the rod 262 between recesses 264 closes switch 260 short circuiting, with the aid of switch 296, the momentarily closed switch 142. Indexing continues until the plunger of switch 260 drops into the next recess of the rod. Thereupon the circuit to relay 146 is broken and carriage indexing switch 254 opens.

*Carriage reverse*

This indexing operation continues until the collars 298 and 304 on the control rod 262 operate either switch 300 or 302. Switch 300 is normally open. Switch 302 is normally closed on the line leading to switch 300 but open to the line leading to tray index relay 316. When switch 300 is momentarily closed, at the end of left hand movement of the carriage, by the collar 298, self locking relay 306 is energized closing the circuit via contact 310 to solenoid 258 and opening the circuit through contact 312 to solenoid 256. Solenoids 256 and 258 control valves to admit fluid pressure on opposite sides of the piston in carriage indexing cylinder 232. The carriage now reverses and continues in motion until switch 260 operated by the index control rod 262 opens up, deenergizing solenoid 146 thus allowing contact 254 to open.

After the carriage has moved to the extreme right, the left hand collar 304 momentarily shifts switch 302 to a position where it momentarily contacts line 314 and to a position where it is out of contact with the line feeding the relay 306. Through the contacts 312 and 310 controlled by relay 306, the solenoid 258 becomes deenergized and solenoid 256 energized to reverse travel of cylinder 232 and the carriage 150. Indexing of the carriage to the left is then controlled by switch 260, as it was when the carriage was indexed to the right.

*Tray index*

As indicated before, operation of switch 302 besides terminating indexing movement of the carriage to the right also closes the circuit to relay 316 which relay has the contacts 318 controlling operation of tray index solenoid 320. This solenoid controls the valves to tray index cylinder 206. A second control for the same relay 316 and solenoid 320 is obtained through switch 322 opposite switch 300 and operated by the collar 298. Therefore at the termination of each carriage indexing movement, whether to the right or left, the tray will be indexed backward so that a new row of pockets will be positioned for the nozzle transfer device. Tray indexing movement whether initiated by operation of switch 302 or switch 322 is terminated by plunger 208 momentarily opening switch 230.

*Elevator lift*

With each tray index movement, the shaft 192 is stepped around driving the disc 324 with its finger 326. The finger thus indexes toward the normally open switch 328. When, after a tray has moved to a position where it is beneath the storage chute, the switch is closed, fluid pressure is admitted to the motors 182, the filled tray is thrust into the storage chute by its elevator and at the same time a new unfilled tray is released from the supply chute ready to move down with its corresponding elevator. Elevator movement is reversed by contact of elevator portion 171 with switch 185 releasing the relay locking circuit involving contact 332 and dropping out contact 334 so that the solenoid 336 controlling the valves to the motors 182 is no longer energized.

This application is a division of application Serial No. 640,444 filed February 15, 1957 which in turn is a division of application Serial No. 423,391 filed April 15, 1954 and patented as No. 2,821,825 on February 4, 1958.

What is claimed is:

Means for transferring an article from a supply element at one elevation to a receiver at another elevation comprising a suction nozzle, and means for moving said suction nozzle comprising a pair of cams, a bell crank lever operated by one of said cams, a nozzle carrying frame elevatable by said lever, said frame pivotally mounting the nozzle, a second bell crank lever operated by the other of said cams, a cam surface on said second bell crank lever, a third lever, a connection between said third lever and the nozzle to swing the nozzle on swinging of the lever, and a cam follower on said third lever riding on the cam surface of the second lever, all whereby the movement of the nozzle is controlled by the two cams and the riding of the cam follower of the third lever on the cam surface of the second lever.

References Cited in the file of this patent

UNITED STATES PATENTS

| | | |
|---|---|---|
| 2,667,420 | Muelemans et al. | Jan. 26, 1954 |
| 2,685,971 | Ewing et al. | Aug. 10, 1954 |